United States Patent [19]

Rochette

[11] Patent Number: 4,845,856
[45] Date of Patent: Jul. 11, 1989

[54] METHOD AND APPARATUS FOR ALIGNING EQUIPMENT ON BOARD A CARRIER VEHICLE AND PARTICULARLY ON BOARD AN AIRCRAFT

[75] Inventor: Marc Rochette, Aix en Provence, France

[73] Assignee: Aerospatiale Societe Nationale Industrielle, Paris, France

[21] Appl. No.: 146,608

[22] Filed: Jan. 21, 1988

[30] Foreign Application Priority Data

Jan. 26, 1987 [FR] France ................ 87 00869

[51] Int. Cl.⁴ .................................... G01C 19/02
[52] U.S. Cl. .................................... 33/228; 33/276; 33/286; 33/333; 33/318
[58] Field of Search ............ 33/275, 276, 278, 228, 33/227, 318, 1 T, 264, 286, 333

[56] References Cited

U.S. PATENT DOCUMENTS

| | | | |
|---|---|---|---|
| 3,731,543 | 5/1973 | Gates | 33/318 X |
| 3,816,935 | 6/1974 | Wilmot | 33/228 |
| 3,851,399 | 12/1974 | Edwards | 33/228 |
| 3,895,871 | 7/1975 | Strasser | 33/1 T |
| 4,483,080 | 11/1984 | Knoll | 33/286 |
| 4,593,474 | 6/1986 | Mayhew | 33/264 |

Primary Examiner—William D. Martin, Jr.
Attorney, Agent, or Firm—Fisher, Christen & Sabol

[57] ABSTRACT

A method for aligning pieces of equipment on board a vehicle, particularly on board an aircraft is disclosed. The method assumes the use of at least one computer on board the vehicle working in connection with the pieces of equipment. Under this method: a reference pattern assembly representative of the reference axis system of the vehicle is disposed on board the vehicle; a specific pattern assembly representative of a specific piece of equipment is disposed on board the vehicle at the position deemed most desirable for placing the particular piece of equipment; the position parameters reflecting the relative positions of the reference pattern assembly and specific pattern assembly are measured through the use of a distance measuring system which preferably uses a pair of theodolyte distance measuring devices which are preferably of the data processing type; the position parameters are stored in a memory; the memory is associated with the computer on board the vehicle; the specific pattern assembly is removed and the piece of equipment is substituted into the position previously occupied by the specific pattern assembly.

An assembly of devices necessary for performing the method of the invention is also disclosed.

8 Claims, 2 Drawing Sheets

METHOD AND APPARATUS FOR ALIGNING EQUIPMENT ON BOARD A CARRIER VEHICLE AND PARTICULARLY ON BOARD AN AIRCRAFT

BACKGROUND OF THE INVENTION

1. Field of the Invention

The present invention relates to a method and apparatus for aligning equipment on board a carrier vehicle more particularly on board an aircraft.

2. Description of the Prior Art

It is known that some pieces of equipment carried on board a vehicle must occupy fixed and precise positions with respect to each other and/or with respect to a reference system of this vehicle. Such equipment is, for example for an aircraft, that used for navigation, such as the gyrocenter, gyrometers or accelerometers, or else for detection, such as a radar, or else again for combat, such as arms and their aiming systems. Such equipment must be "aligned" with the reference system of the vehicle and their respective positions must be "harmonized".

In the present state of the technique, two alignment methods are essentially known:

(a) the first one consists in setting up the equipment in adjustable parts of racks, whose fixed parts are integral with the vehicle. The mechanical alignment of these adjustable rack parts (and so of said equipment) takes place during the phase of installing the equipment on board. Such a method is generally used for alignment of gyrocenters mounted on aircraft of helicopters.

This first method requires long and complicated measurements, using reference points fixed to the structure of the vehicle and sighting marks or levels, for determining the longitudinal axis of said vehicle, as well as the horizontal reference plane thereof.

For this, a distance measuring system is used provided with theodolytes.

It will be noted that, in the use of this first alignment method:

the measurements must be made for each piece of equipment to be aligned;

these measurements calculate the degree of misalignment between the various pieces of equipment and the vehicle and call for precise mechanical positioning correction operations, appropriate for each piece of equipment in turn, until all said pieces of equipment are "aligned" with respect to the axes of the aircraft. This requires long and delicate operations.

(b) in the second alignment method, during the construction of the structure of the vehicle a precise fitting plane is provided and the equipment is thereafter positioned on the fitting plane. This method is often used for positioning doppler radars and vertical gyroscopes in aircraft and helicopters.

It will be noted that this second method, during construction of the structure of the aircraft, involves the precise mechanical alignment of a reference assembly. This assembly, once aligned and immobilized, makes it possible to machine the fitting plane precisely and form therein positioning bores intended to receive centering studs integral with each piece of equipment.

Thus, when this second method is used, it requires the formation of as many fitting planes as there are pieces of equipment to be aligned.

The use of this second method is therefore also long, complex and expensive.

SUMMARY OF THE INVENTION

The present invention overcomes the drawbacks of known alignment methods recalled above and makes it possible to align equipment on board vehicles provided with computers, and particularly on board aircraft, when said equipment works in connection with these computers, which is always the case for modern aircraft.

For this, in accordance with the invention, the method for aligning a piece of equipment on board a carrier vehicle equipped with at least one computer working in connection with said equipment, this method using a theodolyte distance measuring system, is remarkable in that:

a reference pattern assembly representative of the reference axis system of said vehicle is disposed on board said vehicle;

a specific pattern assembly representative of a piece of equipment which is to be disposed on board said vehicle, is positioned at the place which will eventually be occupied by said equipment, by means of said distance measuring system, which is preferably of the data processing type, the position parameters of the specific pattern assembly with respect to said pattern reference assembly are measured (these parameters will hereinafter be referred to as the "position parameters");

said position parameters are stored in a memory;

said memory is associated with a computer, and said piece of equipment is substituted exactly for said specific assembly.

Thus it can be seen that, in accordance with the present invention, it is not a question of strictly aligning said equipment mechanically with the reference axes of the vehicle, as in known methods. It is sufficient to measure the position parameters and to feed them to the computer which may thereafter calculate the parameter of misalignment between said piece of equipment and the reference axes of the vehicle. The computer is then capable of calculating the necessary variation in the axis of said piece of equipment relative to the reference axes of the vehicle so as to take these misalignments into account. The mechanical alignment operations are replaced, as it were, by a data processing alignment.

It will be noted that:

said reference pattern assembly representative of the reference axes system of said vehicle may be fixed permanently or else only during the time required for measuring the misalignments with respect to the structure of said vehicle. It may be fixed in any appropriate way and, in particular, in accordance with the second known method recalled above, using a precise fitting plane affixed to the structure of the vehicle. It will however be noted that, with the present invention, it is not necessary to form as many fitting planes as there are pieces of equipment to be positioned and that it is only necessary to dispose one fitting plane for said reference assembly. In fact, whatever the number of pieces of equipment to be positioned on the vehicle, the measurements of the position parameters and extent of misalignment relative to each of them may be made, from one piece of equipment to another, by means of a single reference pattern assembly. This single reference assembly makes it possible to know accurately the positioning of each piece of equipment with respect to the reference axes of the vehicle and so the relative positioning of the pieces of equipment with respect to each other, said specific pattern assembly which is representative of said piece of equipment may be mounted in a rack. However, because of the invention, this rack does not need to comprise a mobile part which is adjustable with respect to a fixed part, as was the case for implementing the first known method described above. In fact, with the method of the present invention, it is possible to omit the mechanical operations for correcting alignment faults which were necessary in this known method.

numerous data processing distance measurement systems are commercially available which may be used for implementing the method of the invention. Such systems are for example manufactured and sold by the American firm HEWLETT PACKARD, as well as by the Swiss firm WILD HEERBRUGG and the German firm ERNST LEITZ WETZLAR. They generally include two electronic theodolytes connected to a specific computer, the memory in which the parameters for positioning of the pieces of equipment to be positioned are recorded may be of any known type and be incorporated with the aircraft computer or else form a removable unit. It will be noted that when it is desirable to position a plurality of pieces of equipment, aboard a single aircraft, preferably only one memory will be used to store all position parameter and misalignment data. This memory may form a veritable file for identifying the equipment of the corresponding vehicle.

Thus, an assembly in accordance with the invention and intended to put the above described method into practice includes a reference pattern assembly able to be positioned in the vehicle and especially in the aircraft so as to materialize the reference axes of the vehicle and a specific pattern assembly representative of a particular piece of equipment which will eventually be positioned inside the vehicle at the position of said reference pattern assembly.

Of course, when there are several pieces of equipment to be aligned, it is advantageous to provide a single reference pattern assembly and a plurality of specific pattern assemblies, respectively representative of each of said pieces of equipment.

In an advantageous embodiment, said reference pattern assembly and each of said specific pattern assemblies representative of said pieces of equipment are respectively provided with optical cubes or similar devices capable of materializing the reference axes of said vehicle and the reference axes of each of said pieces of equipment.

BRIEF DESCRIPTION OF THE DRAWINGS

The Figs. of the accompanying drawings will better show how the invention may be put into practice. In these Figs., identical references designate similar elements.

DESCRIPTION OF THE PREFERRED EMBODIMENT

Figure 1:
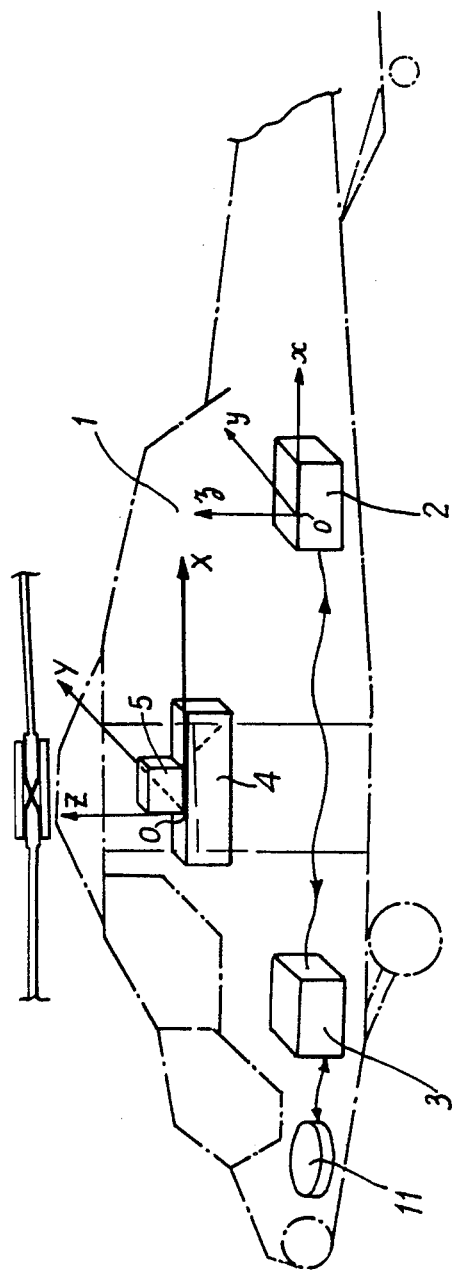
FIG. 1 shows schematically on board a helicopter, a piece of equipment which must occupy a precise position with respect to the axes of said helicopter.

In these Figs., the silhouette of a helicopter 1 is shown schematically with dash dot lines. A plurality of pieces of equipment 2 must be mounted on board this helicopter, only one of which is shown. Each piece of equipment may be viewed as having its own set of reference axes ox, oy, oz. Each of these pieces of equipment 2 must occupy a fixed defined position with respect to the reference axes OX, OY and OZ of said helicopter 1. Furthermore, said pieces of equipment 2 are intended to work in connection with a computer 3 disposed on board the helicopter 1 (see FIG. 1).

Figure 2:
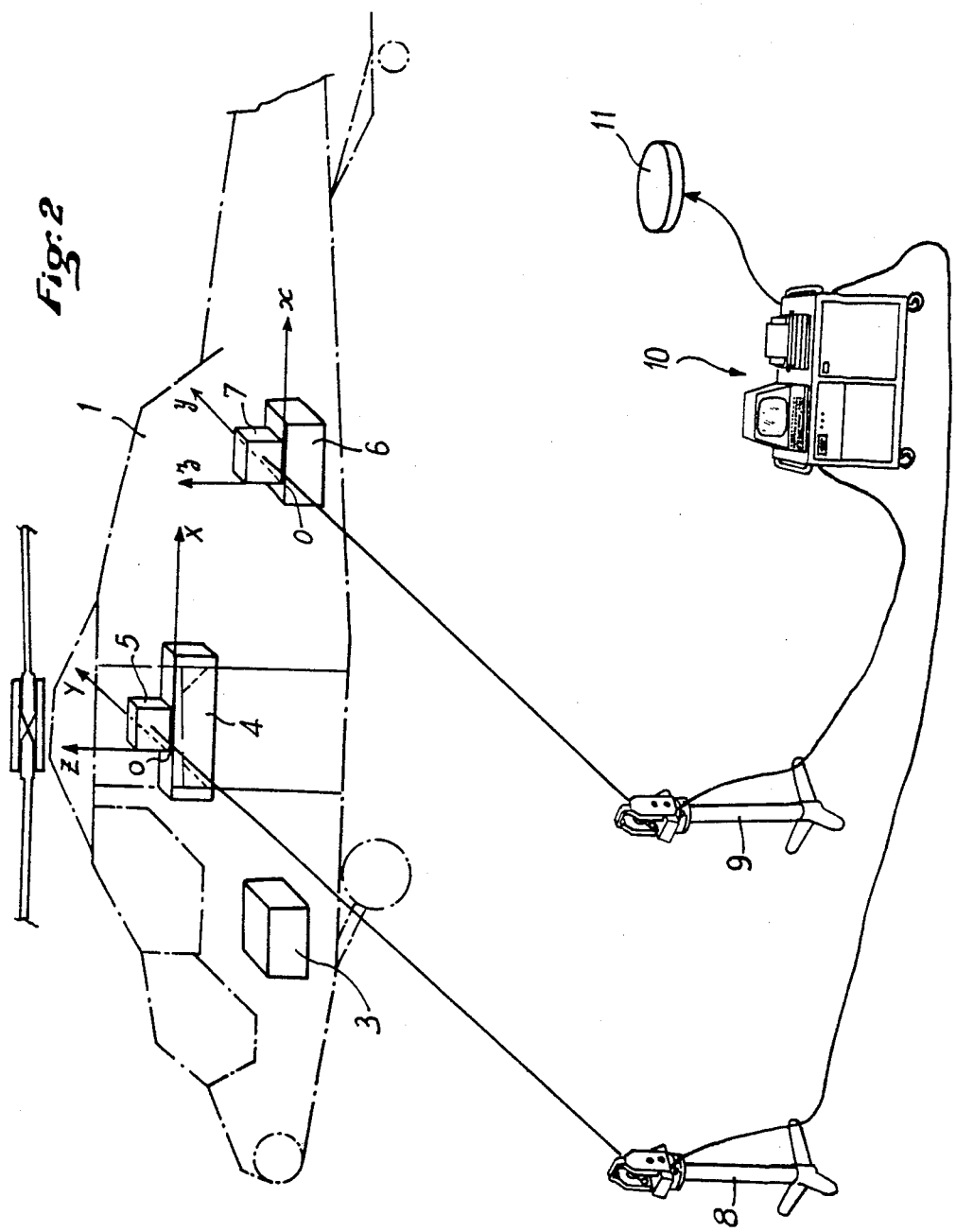
FIG. 2 illustrates schematically the method of the invention for determining the positioning of said piece of equipment.

To materialize the system of the reference axes OX, OY and OZ of helicopter 1, a reference pattern assembly 4, provided with an optical cube 5 (FIG. 2), is provided and positioned. Similarly, for materializing the reference axes ox, oy and oz for each of the pieces of equipment 2, specific pattern assemblies 6 are provided which each include an optical cube 7. These assemblies 6, 7 are positioned in the places on said vehicle which will eventually be occupied by said pieces of equipment. Then, using a data processing distance measurement system having two electronic theodolytes 8 and 9 and a computer 10 (see FIG. 2), the position parameters for each of said assemblies 6 are determined with respect to the reference pattern assembly 4. So this determination is obtained, using a known procedure described hereafter, by pointing the electronic theodolytes 8 and 9 at the optical cubes 5 and 7 of the reference 4 and specific 6 pattern assemblies respectively. These position parameters, calculated by computer 10, are stored in a memory 11. Then, the specific pattern assemblies 6, and possibly the reference pattern assembly 4 as well, are removed and the pieces of equipment 2 are substituted exactly for the associated specific pattern assembly 6. Consequently, the position parameters of said specific pattern assemblies 6 which are stored in memory 11 become the parameters for respective pieces of equipment 2.

Thus, when memory 11 is associated with computer 3 working in connection with the individual pieces of equipment 2, said computer 3 knows the position parameters associated with each of the pieces of equipment with respect to the reference axes OX, OY and OZ of the helicopter 1 and may take them into account in the information which it receives from said pieces of equipment 2 and in the orders which it sends thereto. In this way, any misalignment between the various pieces of equipment and the vehicle will not necessitate the delicate and time-consuming mechanical adjustment process outlined above. Rather, these misalignment parameters will be taken into account and adjusted for by the vehicle's on-board computer.

Of course, the measurements concerning each piece of equipment are made unit after unit.

The position parameters concerning specifically a piece of equipment 2 may be fed to a specific memory 11, itself associated with a specific computer 3. However, it is advantageous, so as to form a veritable file for identifying equipment relatively to aircraft 1, for memory 11 to be common to all the equipment 2 and for this memory to be associated with a computer 3 in connection with each of them.

What is claimed is:

1. A device for use in aligning a piece of equipment on board a vehicle equipped with at least one computer working in conjunction with said piece of equipment, said device comprising:

a reference pattern assembly positionable in the vehicle so as to materialize the reference axis system of said vehicle; and a specific pattern assembly representative of the piece of equipment to position and positionable in the vehicle at the position of said equipment.

2. The device as claimed in claim 1, intended for use in aligning a plurality of different pieces of equipment, comprising a single reference pattern assembly and a plurality of specific pattern assemblies respectively representative of said pieces of equipment.

3. The device as claimed in one of claims 1 or 2, wherein said reference pattern assembly and each of said specific pattern assemblies are respectively provided with optical cubes or similar, capable of materializing respectively the reference axes of said vehicle and the reference axes of said pieces of equipment.

4. A method for aligning a piece of equipment on board a vehicle equipped with at least one computer working in conjunction with said piece of equipment, comprising the following steps:
 (a) disposing on board said vehicle a reference pattern assembly having first optical means and representative of the reference axis system of said vehicle;
 (b) disposing on board said vehicle, at the position to be occupied by said piece of equipment, a specific pattern assembly having second optical means and representative of said piece of equipment;
 (c) using a theodolyte distance measuring system of the processing type for measuring the position parameters of said specific pattern assembly with respect to said reference pattern assembly, said theodolyte distance measuring system operatively associated with said first and second optical means;
 (d) storing said position parameters in a memory;
 (e) associating said memory with said computer; and,
 (f) removing said specific pattern assembly and substituting into the position previously occupied by said specific pattern assembly said piece of equipment, whereby the position parameters previously measured in connection with said specific pattern assembly will now reflect the positioning of said piece of equipment and whereby said computer will be able to calculate the relative position parameters between said piece of equipment and said reference axis system of said vehicle.

5. The method as claimed in claim 4 used for aligning a plurality of pieces of equipment, wherein the measurements of the position parameters for the different pieces of equipment with respect to the corresponding specific pattern assemblies are made successively, piece of equipment after piece of equipment, using a single reference pattern assembly (4).

6. The method as claimed in claim 4, used for aligning a plurality of pieces of equipment, wherein the position parameters for the different pieces of equipment are stored in a single memory.

7. The method as claimed in claim 6, wherein said single memory is associated with a single computer in connection with the whole of said pieces of equipment.

8. A method for aligning a specific piece of equipment on board a vehicle, said vehicle being equipped with at least one computer operatively connected with said piece of equipment, said method comprising the steps of:
 (a) disposing on board said vehicle a reference pattern assembly having first optical means, said first optical means being capable of establishing a reference axis system representative of the position of said vehicle in three-dimensional space;
 (b) disposing on board said vehicle, while said vehicle is under construction, a specific pattern assembly, said specific pattern assembly being positioned at the approximate desired location for the eventual positioning of said piece of equipment, said specific pattern assembly having second optical means, said second optical means being capable of establishing a reference axis system representative of the position of said specific pattern assembly in three-dimensional space;
 (c) utilizing optical means to measure the geometric relationship between said reference axis system associated with said reference pattern assembly and said reference axis system associated with said specific pattern assembly, said geometric relationship constituting a position parameter associated with said piece of equipment;
 (d) storing said position parameter in a memory;
 (e) operatively connecting said memory with said computer on board said vehicle;
 (f) removing said specific pattern assembly; and,
 (g) affixing said piece of equipment to said vehicle in the position previously occupied by said specific pattern assembly, whereby the position parameter previously measured in connection with said specific pattern assembly will now reflect the geometric relationship between said piece of equipment and said reference axis system representative of the position of said vehicle in three-dimensional space and whereby said computer will be able to utilize said position parameter to align said piece of equipment with said vehicle.

* * * * *